(12) United States Patent
Cantrill (10) Patent No.: US 6,523,141 B1
(45) Date of Patent: Feb. 18, 2003

(54) METHOD AND APPARATUS FOR POST-MORTEM KERNEL MEMORY LEAK DETECTION

(75) Inventor: Bryan M. Cantrill, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/512,843

(22) Filed: Feb. 25, 2000

(51) Int. Cl.[7] .......................... H02H 3/05; G06F 12/00; G06F 9/44; G06F 17/30
(52) U.S. Cl. .......................... 714/48; 714/49; 717/124; 707/206; 711/170
(58) Field of Search .............................. 714/15, 48, 49, 714/50, 51; 717/124; 707/206; 711/170

(56) References Cited

U.S. PATENT DOCUMENTS

| | | | |
|---|---|---|---|
| 5,606,661 A | | 2/1997 | Wear et al. .................... 714/38 |
| 5,689,707 A | * | 11/1997 | Donnelly .................... 707/206 |
| 5,740,440 A | | 4/1998 | West .......................... 717/125 |
| 5,790,777 A | * | 8/1998 | Izuta et al. ................... 714/45 |
| 5,842,019 A | * | 11/1998 | Kolawa et al. .............. 717/130 |
| 5,953,530 A | * | 9/1999 | Rishi et al. ................. 717/127 |
| 6,044,475 A | * | 3/2000 | Chung et al. ................. 714/15 |
| 6,115,782 A | * | 9/2000 | Wolczko et al. ............ 711/100 |
| 6,363,467 B1 | * | 3/2002 | Weeks ........................ 711/170 |

FOREIGN PATENT DOCUMENTS

WO WO 9303435 A1 * 2/1993 ........... G06F/11/34

OTHER PUBLICATIONS

Metamata, Productivity and Quality for Java, 1997, Fremont, California.
Visi Comp, Zoom and Pan, Jan. 11, 2000, www.visicomp.com/products/zoom.html.
Microsoft Press, Computer Dictionary, 1997, Redmond, Washington.
Bertrand Meyer, Object–oriented Software Construction, 1988, Prentice Hall(UK).
TurboPower, Memory Sleuth, Jan. 26, 1999, www.turbopower.com/products/sleuth/details/.

* cited by examiner

Primary Examiner—Robert Beausoliel
Assistant Examiner—Emerson Puente
(74) Attorney, Agent, or Firm—Beyer Weaver & Thomas, LLP (57) ABSTRACT

Methods and apparatus for detecting and reporting memory leaks associated with an operating system are disclosed. In accordance with one aspect of the present invention, a method for identifying a section of dynamically allocated memory which may not be explicitly freed includes processing information associated with a failure of an operating system and identifying a call-site that is associated with the section of the dynamically allocated memory using the information. Once the call-site is identified, a report may be generated to identify the call-site as being associated with the section of dynamically allocated memory. In one embodiment, obtaining information associated with a failure of the operating system includes obtaining an image of the operating system which is created when a kernel associated with the operating system crashes.

20 Claims, 6 Drawing Sheets

METHOD AND APPARATUS FOR POST-MORTEM KERNEL MEMORY LEAK DETECTION

BACKGROUND OF THE INVENTION

1. Field of Invention

The present invention relates generally to the allocation of memory in computing systems. More particularly, the present invention relates to identifying and reporting memory leaks in computing systems.

2. Description of the Related Art

The amount of memory, both statically allocated memory and dynamically allocated memory, available to a computing system or, more specifically, processes executing on the computing system, is limited. As such, different processes must typically share memory resources. In order for memory to be shared, memory is recycled. In other words, a section of memory which is no longer used by one process may be reclaimed and allocated for use by another process.

A kernel is privileged mode or "supervisor" software which executes for the lifetime of a machine, e.g., a computing system. During normal operation, a kernel typically dynamically allocates data structures. When allocated dynamic data structures are no longer needed within a computing system, the dynamic data structure will ideally be explicitly freed, as will be understood by those skilled in the art. Only "reachable" memory, i.e., memory that may ultimately be reached from a kernel data module such as a buffer or a thread stack, may be freed. It should be appreciated that "unreachable memory, i.e., memory that may not be reached from a kernel data module, may not be freed. Such "unfreeable" memory typically constitutes a memory leak.

Figure 1:
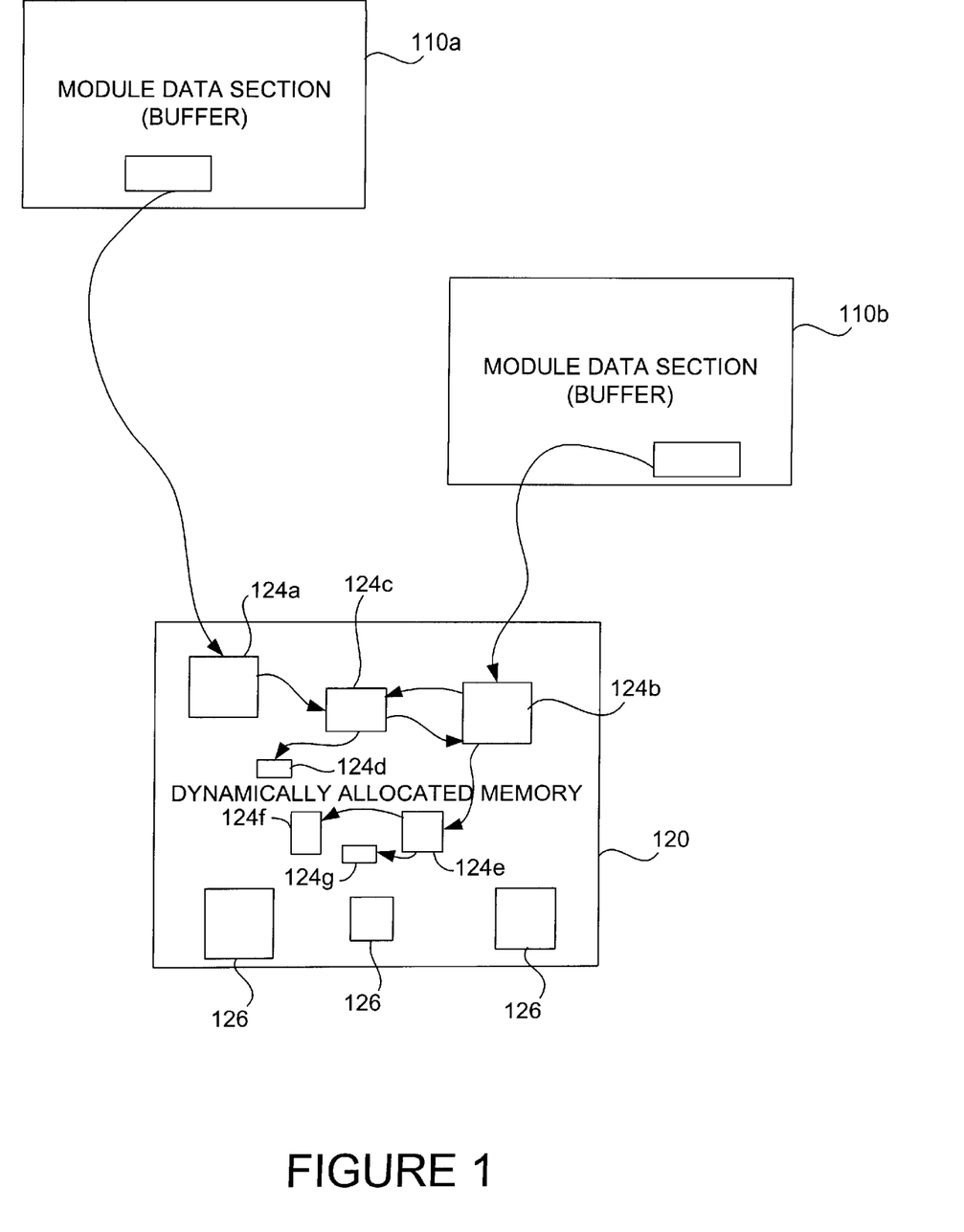
FIG. 1 is a diagrammatic representation of a section of dynamically allocated memory with unreachable pieces of memory.

FIG. 1 is a diagrammatic representation of a section of dynamically allocated memory with unreachable pieces of memory. A section of dynamically allocated memory 120 includes sections 124, 126. Sections 124 are considered to be reachable, as sections 124 may be traced back to a module data section 110 such as a buffer or a thread stack. In other words, sections 124 may be traced back to a root set, as will be understood by those skilled in the art. For example, section 124f may be traced back to module data section 110b through sections 124b and 124e. Sections 126 are considered to be unreachable since sections 126 may not be traced back to a module data section 110, e.g., are not traceable back to a root set.

Reachable sections 124 are explicitly freed when reachable sections 124 are no longer being used. Unreachable sections 126 may not be explicitly freed by a kernel, and are difficult to identify. Unreachable sections 126 often result in memory leaks, as unreachable sections 126 are sections of memory which may not be explicitly freed and, hence, may not be reallocated for other uses.

Because the available memory in a computing system is reduced, memory leaks generally cause an operating system to operate more slowly. When the overall amount of leaked memory is high, memory leaks may eventually result in no memory being available for allocations. When memory is no longer available for allocations, a kernel may hang indefinitely while waiting for memory to become available. Typically, unless a memory leak causes an overall machine failure, memory leaks are difficult to locate. By way of example, a memory leak may be manifested as a few bytes, e.g., eight bytes or less, in an error path. A few missing bytes typically does not appear to be important and, hence, the memory leak may be overlooked.

One standard method of identifying memory leaks involves looking at "buckets" of memory to identify a bucket which includes an abnormal number of allocations. A bucket that includes an abnormal number of allocations is considered to be likely to include memory leaks. For instance, if a bucket includes many more allocations than typically expected, the indication may be that additional memory is allocated because of memory leaks. Once memory leaks, or potential memory leaks, are identified, memory leaks may be fixed by modifying the errant code to explicitly free memory that is no longer in use. It should be understood that any suitable method may generally be used to fix memory leaks. By way of example, a programmer may modify the source code for an operating system in order to explicitly free memory which was leaked.

Searching for memory leaks is often inefficient, as methods used to locate memory leaks are time-consuming and often inaccurate. By way of example, searching buckets of memory and identifying an unusual number of memory allocations in order to identify likely memory leaks is a subjective process. Further, identifying memory leaks by identifying an abnormal number of memory allocations is typically effective only in finding frequent or large memory leaks. That is, studying the number of memory allocations, in general, is relatively ineffective in identifying memory leaks which are not associated with frequently executed code or are not large buffers leaked by a kernel. Studying the number of memory allocations is relatively ineffective in identifying infrequent or small memory leaks, e.g., memory leaks associated with a rarely executed code path or memory leaks such as a single byte that is leaked only once.

Failing to detect and to correct infrequent or small memory leaks may result in significant problems. For example, if a rarely executed code path that has associated memory leaks is eventually executed frequently, the associated memory leaks may lead to a significant slowing of the overall computing system and, eventually a crash of the system. In addition, many infrequent or small memory leaks may eventually cause enough overall memory leakage to cause a system failure.

Therefore, what is desired is a method and an apparatus for efficiently detecting memory leaks. More specifically, what is needed it an effective method and apparatus for identifying and correcting infrequent and small memory leaks.

SUMMARY OF THE INVENTION

The present invention relates to methods and apparatus for detecting and reporting memory leaks associated with an operating system. In accordance with one aspect of the present invention, a method for identifying a section of leaked dynamically allocated memory includes obtaining information associated with a failure of an operating system and identifying a function that may be associated with the section of the dynamically allocated memory using the information. Once the function is identified, a determination is made as to when the function is actually associated with the section of the dynamically allocated memory. In one embodiment, obtaining information associated with a failure of the operating system includes obtaining an image of the operating system which is created when a kernel associated with the operating system crashes.

In another embodiment, when it is determined that the function is associated with the section of the dynamically allocated memory, the method further includes determining the source of the leaked dynamically allocated memory. In such an embodiment, determining the source of the leaked section of the dynamically allocated memory includes obtaining a plurality of pointers associated with the dynamically allocated memory and placing the plurality of pointers into a data structure. Once the plurality of pointers are placed in the data structure, a first pointer included in the plurality of pointers is identified as being associated with the section of the dynamically allocated memory. The first pointer is then removed from the data structure, thereby enabling the section of the dynamically allocated memory to be located and subsequently freed.

According to another aspect of the present invention, a method for locating a section of unreachable memory associated with a computing system includes obtaining information associated with a failure of an operating system arranged to run on the computing system. Once the information is obtained, a function that is potentially associated with the section of unreachable memory is identified off-line using the information. It is then determined when the function is associated with the section of unreachable memory. Determining when the function is associated with the section of unreachable memory includes identifying a pointer associated with the unreachable memory.

According to yet another aspect of the present invention, a method for detecting a section of unreachable memory associated with a computing system includes obtaining a stack trace associated with the computing system. The stack trace is obtained from an image of an operating system associated with the computing system. A call-site that has leaked memory is identified using the stack trace, and data structures, e.g., allocator data structures and module data structures, are walked through to identify a section of unreachable memory associated with the call-site.

In accordance with still another aspect of the present invention, a computer system that is suitable for identifying a section of dynamically allocated memory includes a processor and a memory, which includes the section of dynamically allocated memory, that is coupled with the processor. The system also includes an operating system associated with the processor. The section of the dynamically allocated memory is arranged such that the operating system associated with the computing environment is not able to free the section of the dynamically allocated memory. A recording mechanism of the system is arranged to store an image of the operating system that is created when the operating system fails, and a function identifier is arranged to use the image of the operating system to identify a function associated with the section of the dynamically allocated memory.

In one embodiment, the computer system includes a detector mechanism arranged to actually locate a leaked section of the dynamically allocated memory when it is determined that the function is associated with the section of the dynamically allocated memory. In such an embodiment, the computer system also includes a data structure, and the detector mechanism further places a plurality of pointers, associated with the dynamically allocated memory, into the data structure.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

When a memory leak occurs in a computing system, the execution of an operating system is typically compromised. Memory leaks may result in a slow operation of an operating system, and ultimately result in insufficient memory being available for memory allocations. Unless a memory leak causes an overall machine failure, or causes a kernel to hang indefinitely, a memory leak is difficult to locate. Searching for memory leaks is generally time-consuming and inaccurate. Standard methods used to identify memory leaks often involve studying the number of memory allocations to determine if an unusual number of memory allocations has occurred. While such methods may be relatively effective in identifying both large memory leaks and memory leaks which are associated with frequently executed code, such methods are typically ineffective in identifying infrequent or small memory leaks.

In general, when a kernel "dies," i. e., when a machine failure occurs, the operating system ceases to operate. The death of a kernel may occur when the kernel hangs indefinitely while waiting for free memory to become available. However, the death of a kernel most often occurs due to failures in other systems associated with the kernel. Also, a system administrator may explicitly induce a fatal failure of a kernel in order to determine, for example, how a system responds to a fatal failure. When a kernel dies, an image of the operating system is typically written to a disk. When the operating system is rebooted, a crash dump is generated, and the image of the operating system is loaded from the disk. The crash dump is processed to identify memory leaks.

A post-mortem memory leak detection process enables a system crash dump, or a file which essentially contains an image of the operating system of a system which has failed, to be used to locate memory leaks. By using data sections associated with the kernel as a root set, in addition to information contained in the crash dump file, a suitable garbage collection algorithm, e.g., a mark and sweep garbage collection process, may be used to identify memory leaks. In one embodiment, a post-mortem memory leak detection process involves creating an array, e.g., a hash table, of pointer values from a kernel address space by iterating through a list of kernel address space segments. Once the array is created, any pointers to buffers contained within internal data structures of a memory allocator are removed from the array. If any pointers identify dynamically allocated memory but are not reachable from the root set, e.g., kernel module data and thread stacks, the pointers are considered to be associated with memory leaks. Once memory leaks are identified, they may be corrected.

A post-mortem memory leak detection process allows run-time considerations that are typically associated with detecting memory leaks, e.g., considerations of system overhead and time, may be substantially avoided. In other words, a post-mortem memory leak detection process may be performed substantially off-line.

Figure 2:
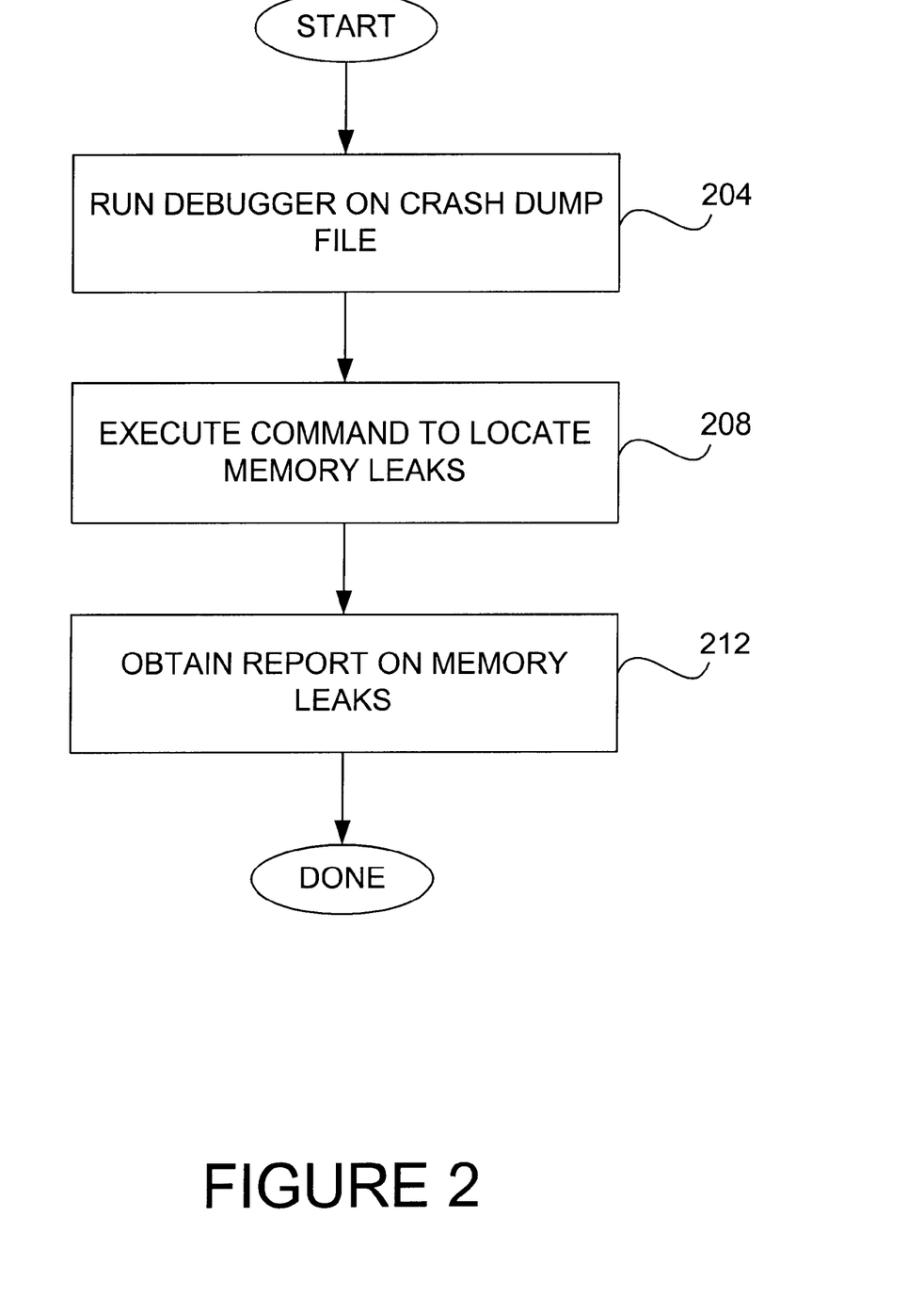
FIG. 2 is a process flow diagram which illustrates the steps associated with managing memory leaks in accordance with an embodiment of the present invention.

When a kernel fails, whether it fails as a result of memory leakage or otherwise, a debugger is often executed on the associated crash dump file in order to ascertain why the kernel failed. According to one embodiment of the present invention, the debugger may be configured to use the crash dump file to identify call-sites that are associated with memory leaks. With reference to FIG. 2, a method of dealing with memory leakage will be described in accordance with an embodiment of the present invention. A process of managing memory leaks begins at step 204 in which a user, e.g., a system administrator of a computing system, executes debugging software on a crash dump file. Running a debugger on a crash dump file enables information contained in the crash dump file to be studied to determine, for instance, a cause of a crash.

Debugging is, in general, a process of analyzing a software program in order to remove "bugs," or defects, in the software program. That is, debugging is a method of studying the execution of a program as well as states associated with a program in order to identify and correct defects in the program. Hence, a debugger is a tool which executes commands that enable debugging to occur, as will be understood by those skilled in the art.

After beginning the execution of a debugger in step 204, the debugger may execute a command to locate memory leaks in step 208. In general, a command to locate memory leaks may be included in substantially any debugger that has an associated memory allocator. By way of example, in one embodiment, such a command is included in a debugger that is associated with a kernel memory allocator of the Solaris™ Operating System available commercially from Sun Microsystems, Inc. of Palo Alto, Calif. One method of executing a command to locate memory leaks will be discussed below with reference to FIG. 3.

Once the command to locate memory leaks is executed, a report on the memory leaks is obtained in step 212. The report on memory leaks may be subsequently used to facilitate the fixing of memory leaks. It should be appreciated that, in general, the contents and format of a report on memory leaks may be widely varied. However, the contents of a report on memory leaks typically identify the call-sites or functions which leaked memory. After the report on memory leaks is obtained, e.g., by a user, the process of managing memory leaks is completed.

Figure 3:
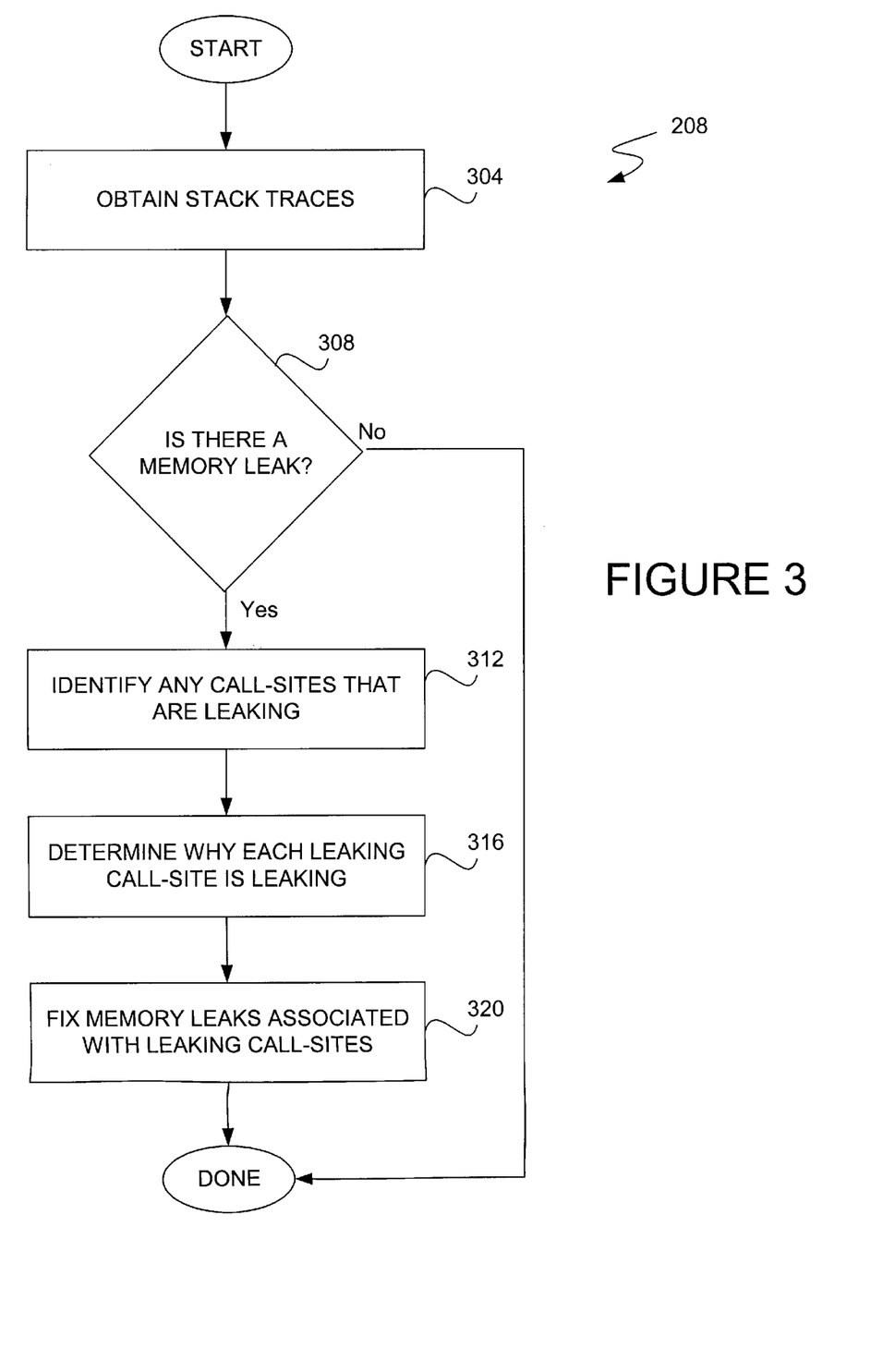
FIG. 3 is a process flow diagram which illustrates the steps associated with executing a command to locate and to fix memory leaks, i.e., step 208 of FIG. 2, in accordance with an embodiment of the present invention.

FIG. 3 is a process flow diagram which illustrates the steps associated with one method of executing a command to locate memory leaks, i.e., step 208 of FIG. 2, in accordance with an embodiment of the present invention. The execution of a command to locate memory leaks begins at step 304 where appropriate stack traces are obtained, e.g., by a device that is executing the command to locate memory leaks. As will be appreciated by those skilled in the art, a system state may be recorded when a region of memory is dynamically allocated. Such a system state may include the requesting subsystem, the requesting function, or the entire stack trace, i.e., stack back trace, leading to an allocation. Once the stack traces are obtained, a determination is made in step 308 as to whether the stack traces indicate that there is at least one existing memory leak. If the determination in step 308 is that there does not appear to be any memory leakage, then the process of executing a command to locate memory leaks is completed.

Alternatively, when it is determined that there is at least one memory leak in existence, then process flow moves from step 308 to step 312 in which the system state recorded at the time of allocation is used to determine a call-site, e.g., a call-site that requested the leaked region. The identification of any call-sites that are leaking enables call-sites and the contents of leaked regions to be used in determining errant code paths in which the leak regions should have been explicitly freed. In one embodiment, the call-sites are identified using the stack traces.

After call-sites that are leaking are identified in step 312, a determination as to why each call-site is leaking is made in step 316. Although a call-site may leak memory for a variety of different reasons, a call-site typically leaks memory due to oversights in error code paths. From step 316, process flow proceeds to step 320 in which memory leaks associated with leaking call-sites are reported. One method of reporting memory leaks will be described below with reference to FIGS. 4A and 4B. In the described embodiment, once memory leaks are identified and reported, the process of executing a command to identify memory leaks is completed. It should be understood, however, that while the command to fix memory leaks may generally be completed when the leaked allocations and their call-sites have been identified, the command may also include actually fixing memory leaks. Actually fixing a leak typically requires modifying the overall software product to prevent future leakages.

Figure 4A:
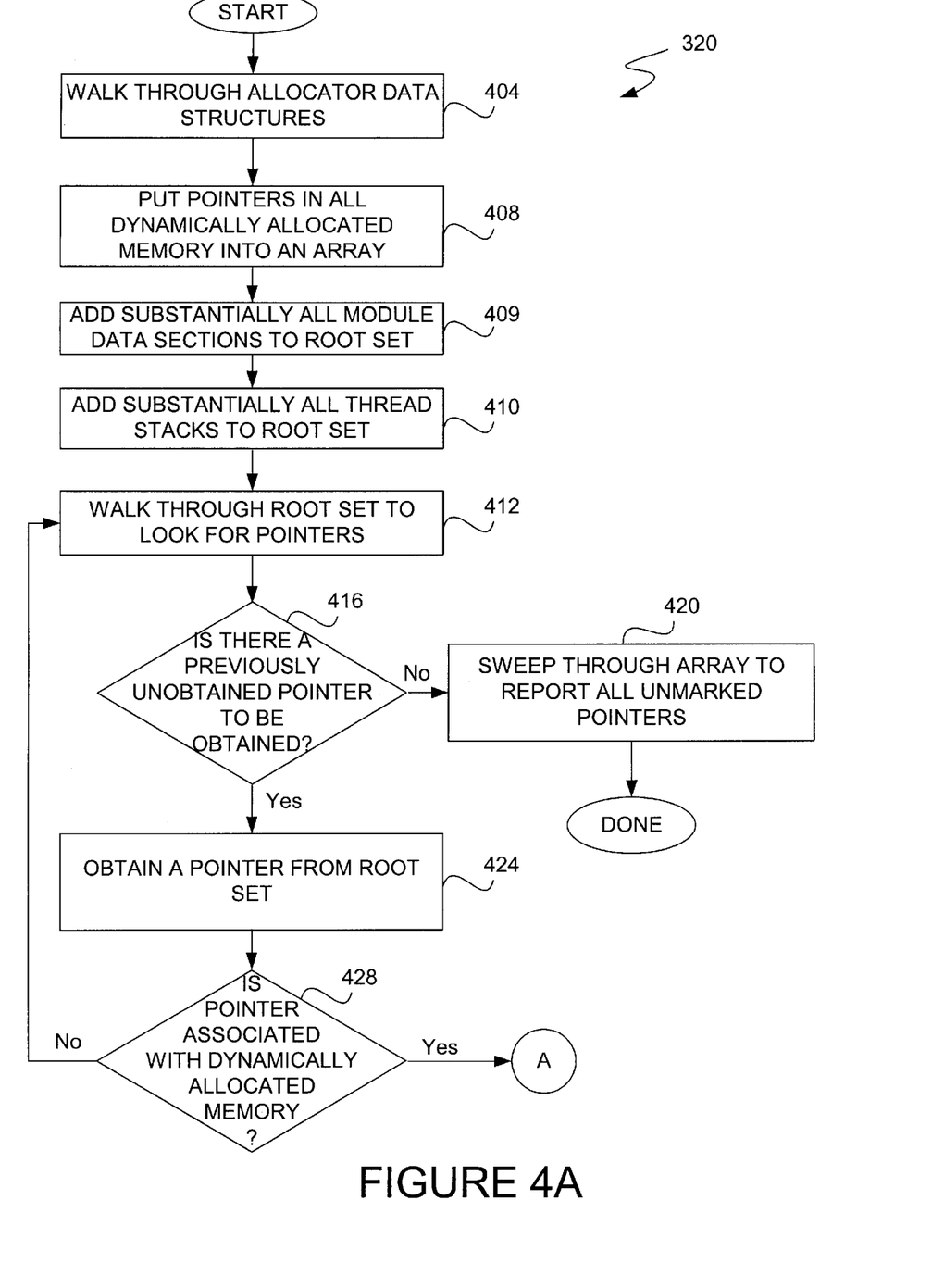
FIGS. 4A and 4B are a process flow diagram which illustrates the steps associated with reporting memory leaks, i. e., step 320 of FIG. 3, in accordance with an embodiment of the present invention.
Figure 4B:
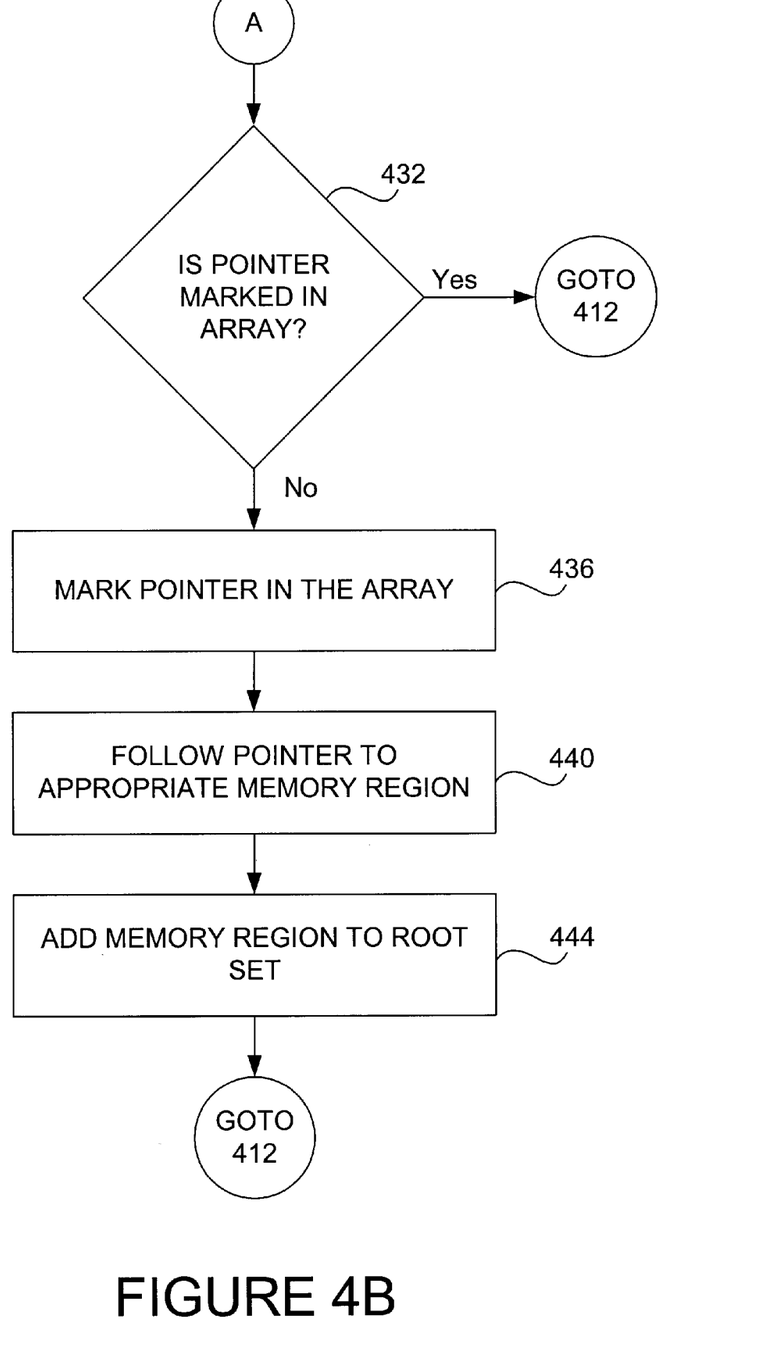

Referring next to FIGS. 4A and 4B, the steps associated with one process of reporting memory leaks will be described in accordance with an embodiment of the present invention. As discussed above, actually fixing memory leaks involves modifying errant code paths. For ease of discussion, the reporting of memory leaks will be discussed in terms of identifying sections of leaked memory. The process of reporting a memory leak begins at step 404 in which allocator data structures, or data structures that are associated with a memory allocator, are "walked" through or otherwise iterated over. An allocator data structure is, in one embodiment, a list of allocated buffers. Walking through data structures, as will be understood by those skilled in the art, involves iterating through pointers associated with data structures to locate sections of data that are pointed to from other sections of data.

Any pointers which are identified as pointing to dynamically allocated memory are placed into an array, or a similar structure, in step 408. It should be appreciated that these pointers may include both reachable pointers and unreachable pointers. That is, pointers include those for which a path to reach them from either a thread stack or a buffer exists, and those for which there is no existing path to reach them.

Typically, the array is sorted based on value in order to enable fast look-ups to occur using the array. The minimum and maximum values associated with the array of pointers associated with dynamically allocated memory may be identified, e.g., through a sorting process, as will be discussed in more detail below.

As will be discussed below, the array will effectively be arranged to identify reachable and unreachable pointers. For example, pointers in the array may eventually be marked to indicate that those marked pointers are reachable, whereas unmarked pointers may eventually identify unreachable pointers. When a pointer is marked as being reachable, the pointer may be followed into buffers, e.g., new buffers, to identify additional pointers which may need to be marked within the array. It should be appreciated that when pointers are not accurately followed and marked accordingly, memory leaks may be reported where none may exist.

Returning to FIGS. 4A and 4B, once pointers are placed into an array in step 408, the root set is generated. The root set typically is made up of memory regions which are reachable, and is initialized to contain module data sections and thread stacks. Specifically, from step 408, process flow proceeds to step 409 in which substantially all module data sections are added to the root set. Once substantially all module data sections are added to the root set, substantially all thread stacks are then added to the root set in step 410. The root set is walked through in step 412 in order to identify pointers that are associated with the root set. As will be appreciated by those skilled in the art, memory regions in the root set may be accessed one by one and walked through, until there are no additional memory regions in the root set to be accessed. In other words, substantially all memory regions in the root set may be accessed through an iterative process.

While walking through the memory regions in the root set, a determination is made in step 416 regarding whether there is a previously unobtained pointer, contained within a memory region in the root set, to be obtained. In other words, it is determined in step 416 whether there are any pointers in the root set which have not already been obtained.

When the determination in step 416 is that there is at least one previously unobtained pointer to be obtained, then process flow proceeds to step 424 in which a previously unobtained pointer is obtained. Once such a pointer is obtained, then it is determined in step 428 whether the obtained pointer is associated with dynamically allocated memory. If it is determined that the obtained pointer is not associated with dynamically allocated memory, then process flow returns to step 412 where a walk through the root set to identify pointers continues. That is, process flow returns to step 412 where either a walk continues through the current module data section, if it contains additional pointers to be obtained, or a new module data section is walked through.

Alternatively, if it is determined in step 428 that the obtained pointer is associated with dynamically allocated memory, then in step 432, a determination is made as to whether the obtained pointer is marked in the array, i.e., the array of substantially all pointers in dynamically allocated memory. In the described embodiment, when a pointer is marked in the array, the indication is that the pointer is that the pointer is reachable. That is, a pointer that is marked in the array is identified as having a path which enables the pointer to be reached.

In one embodiment, in order to reduce the overhead associated with a determination of whether a pointer is marked, determining whether the obtained pointer is marked in the array may include comparing the value associated with the obtained pointer to the minimum and maximum values in the array. If the value associated with the obtained pointer is either less than the minimum value or greater than the maximum value, then the overhead associated with checking the value associated with the obtained pointer against the values in the array may be essentially avoided.

When the determination in step 432 is that the obtained pointer is marked in the array, then process flow returns to step 412 in which memory regions in the root set are walked through to identify pointers. Alternatively, if it is determined in step 432 that the obtained pointer is not marked in the array, then in step 436, the pointer is marked in the array. It should be appreciated that in the described embodiment, any pointer that is obtained while a walk is performed through the root set is a reachable pointer.

After the obtained pointer is marked in the array, then in step 440 the pointer is followed to the dynamically allocated region identified by the pointer. In step 444, the memory region identified by the obtained pointer is added to the root set. Once the memory region is added to the root set, process flow then returns to step 412 where iteration continues over the root set.

Returning to step 416 and the determination of whether there is a previously unobtained pointer to be obtained, when it is determined that there are no unobtained pointers to be obtained, then the indication is that all reachable pointers in the array of pointers have been marked. Accordingly, process flow proceeds to step 420 where the array is swept through to report all unmarked pointers. In other words, a sweep is performed in step 420 to report all unreachable pointers. Once the sweep to report or to remove unreachable pointers is performed, the process of reporting memory leaks is completed.

Figure 5:
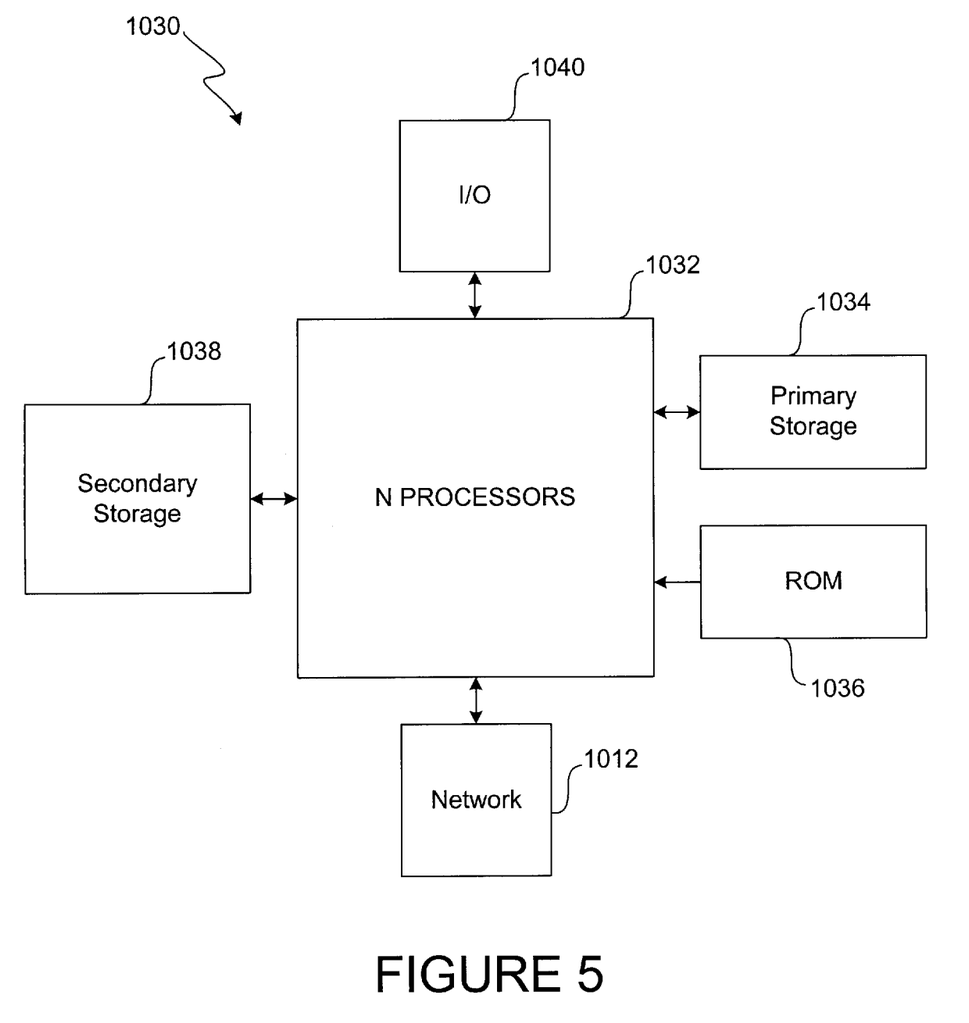
FIG. 5 is a diagrammatic representation of a computer system that is suitable for implementing the present invention.

A computer system which may be arranged to perform a post-mortem memory leak detection or, more specifically, a post-mortem kernel memory leak detection, may take on a variety of different configurations. A suitable computer system will enable a kernel to execute thereon, and will include memory which may be dynamically allocated. FIG. 5 illustrates a typical, general-purpose computer system suitable for implementing the present invention. Specifically, FIG. 5 illustrates a computer system on which a kernel may run, and includes dynamically allocated memory that may be leaked. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). Processor 1032 may execute instructions associated with identifying memory leaks. Primary storage devices 1034 may include dynamically allocated memory, i.e., memory associated with primary storage devices 1034 may be leaked.

Computer system 1030 or, more specifically, CPU 1032, may be arranged to support a virtual machine, as will be appreciated by those skilled in the art. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The data storage capacity provided by secondary storage medium 1038 generally includes dynamically allocated memory. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data unidirectionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, the steps associated with the various methods of the present invention may be reordered, added, and removed. For instance, the steps associated with reporting memory leaks in a post-mortem manner may include steps which explicitly ensure that if a module data section includes more than one pointer to be obtained, that module data section is completely walked through before another module data section is walked through. Additionally, the steps may include steps which explicitly incrementally walk through each module data section.

As discussed above, a root set may include actual data sections, e.g., buffers, as well as thread stacks. In one embodiment, iterating or walking through the root set may involve first walking through all module data, then walking through all available thread stacks. Alternatively, walking through the root set may involve walking through all available thread stacks prior to walking through all available buffers. It should be appreciated that in some cases, walking through module data sections may involve walking through available buffers and available thread stacks such that some buffers are walked through before some thread stacks, and vice versa.

While data sections have generally been described as including module data and thread stacks, it should be understood that data sections may generally include any data section which is associated with a root set. That is, substantially any module data sections in which a pointer has a root may be walked through to identify and to fix memory leaks. In some embodiments, module data sections may include various caches, in addition to buffers and thread stacks, without departing from the spirit or the scope of the present invention.

The process of reporting memory leaks has been described as including storing all pointers in an array, marking the pointers in the array which are reachable, and identifying all unmarked pointers, thereby identifying memory leaks. However, it should be appreciated that the process of reporting memory leaks may vary widely. In one embodiment, for example, identifying call-sites which are leaking may include creating an array of all pointers and marking reachable pointers within the array. In such an embodiment, reporting the memory leaks may involve substantially only sweeping through the array to note pointers which are not marked, i.e., unreachable pointers.

Although the creation of an array of pointers that are associated with dynamically allocated memory has generally been described in terms of placing pointers into a data structure such as an array, the actual steps associated with creating an array of pointers may vary widely without departing from the spirit or the scope of the present invention. For example, the array may be created incrementally by obtaining values for each dynamically allocated memory region, then adding the values to the array. The array may then be sorted by value to identify the minimum and maximum values in the array. Alternatively, tracking variables may be used to hold current minimum and maximum values in the array as values are added to the array.

It should be appreciated that in lieu of creating an array of pointers, pointers associated with dynamically allocated memory may be placed into substantially any suitable data structure. Suitable data structures may include, but are not limited to, list structures, hash tables, and files, in addition to arrays.

A debugger that is associated with a kernel memory allocator of the Solaris™ Operating System has generally been described as being suitable for detecting memory leaks post-mortem. It should be understood that the Solaris™ Operating System is an example of a suitable operating system which may implement post-mortem memory leak detection. In general, post-mortem memory leak detection may be implemented for use with substantially any suitable operating system. Therefore, the present examples are to be considered as illustrative and not restrictive, and the invention is not to be limited to the details given herein, but may be modified within the scope of the appended claims.

What is claimed is:

1. A computer-implemented method for identifying a section of dynamically allocated memory associated with a computing environment, the section of the dynamically allocated memory being arranged such that an operating system associated with the computing environment is not able to free the section of the dynamically allocated memory, the computer-implemented method comprising:

obtaining information associated with a failure of the operating system;

identifying a call-site that is associated with the section of the dynamically allocated memory using the information; and determining the association between the call-site and the section of the dynamically allocated memory.

2. A computer-implemented method as recited in claim 1 wherein the section of dynamically allocated memory is a leaked section of memory.

3. A computer-implemented method as recited in claim 1 wherein when it is determined that the call-site is associated with the section of the dynamically allocated memory, the method further includes generating a report on the section of the dynamically allocated memory.

4. A computer-implemented method as recited in claim 3 wherein freeing the section of the dynamically allocated memory includes:

obtaining a plurality of pointers associated with the dynamically allocated memory;

placing the plurality of pointers into a data structure; and identifying a first pointer included in the plurality of pointers as being associated with the section of the dynamically allocated memory, wherein identifying the first pointer enables the first pointer to be included in the report.

5. A computer-implemented method as recited in claim 4 wherein identifying the at least one pointer included in the plurality of pointers as being associated with the section of the dynamically allocated memory includes:
   a) walking through at least one module data section associated with the computing environment;
   b) identifying a second pointer associated with the at least one module data section;
   c) determining when the second pointer is associated with the dynamically allocated memory; and
   d) marking the second pointer as being associated with the dynamically allocated memory when it is determined that the second pointer is associated with the dynamically allocated memory, the second pointer being marked in the data structure.

6. A computer-implemented method as recited in claim 5 further including repeating a) through d) until substantially all pointers associated with the at least one module data section have been identified.

7. A computer-implemented method as recited in claim 6 further including removing any pointers of the plurality of pointers from the data structure which are not marked, wherein removing the any pointers of the plurality of pointers form the data structure which are not marked includes removing the first pointer from the data structure.

8. A computer-implemented method as recited in claim 1 wherein obtaining information associated with a failure of the operating system includes obtaining an image of the operating system, the image being created when a kernel associated with the operating system fails.

9. A computer-implemented method for locating a section of unreachable memory associated with a computing system, the computer-implemented method comprising:
   obtaining information associated with a failure of an operating system, the operating system being arranged to run on the computing system;
   identifying a function that is potentially associated with the section of unreachable memory using the information, wherein the function is identified off-line; and
   determining when the function is associated with the section of unreachable memory, wherein determining when the function is associated with the section of unreachable memory includes identifying a pointer associated with the unreachable memory.

10. A computer system suitable for identifying a section of dynamically allocated memory, the computer system comprising:
   a memory, wherein the memory is arranged to be dynamically allocated and includes the section of the dynamically allocated memory;
   an operating system associated with the memory, wherein the section of the dynamically allocated memory is arranged such that the operating system is not able to free the section of the dynamically allocated memory:
   a recording mechanism arranged to store an image of the operating system, the image of the operating system being created when the operating system fails; and
   a function identifier arranged to use the image of the operating system to identify a function associated with the section of the dynamically allocated memory, the function identifier further being arranged to determine when the function is associated with the section of the dynamically allocated memory.

11. A computer system according to claim 10 further including a detector mechanism arranged to report the section of the dynamically allocated memory when it is determined that the function is associated with the section of the dynamically allocated memory.

12. A computer system according to claim 11 further including a data structure, the detector mechanism further being arranged to:
   obtain a plurality of pointers associated with the dynamically allocated memory;
   place the plurality of pointers into the data structure;
   identify a first pointer included in the plurality of pointers as being associated with the section of the dynamically allocated memory; and
   remove the first pointer from the data structure, wherein removing the first pointer from the data structure causes the section of the dynamically allocated memory to be freed.

13. A computer system according to claim 12 wherein the detector mechanism is further arranged to:
   walk through at least one module data section associated with the computing environment;
   identify a second pointer associated with the at least one module data section;
   determine when the second pointer is associated with the dynamically allocated memory; and
   mark the second pointer as being associated with the dynamically allocated memory when it is determined that the second pointer is associated with the dynamically allocated memory, the second pointer being marked in the data structure.

14. A computer system according to claim 11 wherein the detector mechanism is further arranged to remove any pointers of the plurality of pointers from the data structure which are not marked.

15. A computer program product having computer code embodied in a computer readable memory, the computer program product being arranged for identifying a section of dynamically allocated memory associated with a computing environment, the section of the dynamically allocated memory being arranged such that an operating system associated with the computing environment is not able to free the section of the dynamically allocated memory, the computer code comprising:
   computer code for obtaining information associated with a failure of the operating system;
   computer code for identifying a call-site associated with the section of the dynamically allocated memory using the information; and
   computer code for generating a report, the report being arranged to identify that the call-site is associated with the section of the dynamically allocated memory.

16. A computer program product as recited in claim 15 wherein the section of the dynamically allocated memory is leaked memory.

17. A computer program product as recited in claim 16 wherein computer code for freeing the section of the dynamically allocated memory includes:
   computer code for obtaining a plurality of pointers associated with the dynamically allocated memory;
   computer code for placing the plurality of pointers into a data structure;

computer code for identifying a first pointer included in the plurality of pointers as being associated with the section of the dynamically allocated memory; and computer code for removing the first pointer from the data structure, wherein removing the first pointer from the data structure causes the section of the dynamically allocated memory to be freed.

18. A computer program product as recited in claim 17 wherein computer code for identifying the at least one pointer included in the plurality of pointers as being associated with the section of the dynamically allocated memory includes:

computer code for walking through at least one module data section associated with the computing environment;

computer code for identifying a second pointer associated with the at least one module data section;

computer code for determining when the second pointer is associated with the dynamically allocated memory; and computer code for identifying the second pointer as being associated with the dynamically allocated memory when it is determined that the second pointer is associated with the dynamically allocated memory, the second pointer being identified in the data structure.

19. A computer program product as recited in claim 18 further including computer code for removing any pointers of the plurality of pointers from the data structure which are not identified, wherein removing the any pointers of the plurality of pointers form the data structure which are not identified includes removing the first pointer from the data structure.

20. A method for detecting a section of unreachable memory associated with a computing system, the method comprising:

obtaining a stack trace associated with the computing system, wherein the stack trace is obtained from an image of an operating system associated with the computing system;

identifying a call-site which has leaked memory, the call-site being identified at least in part using the stack trace; and walking through data structures associated with the computing system to identify a section of unreachable memory associated with the call-site.

* * * * *